Figures 1, 2:
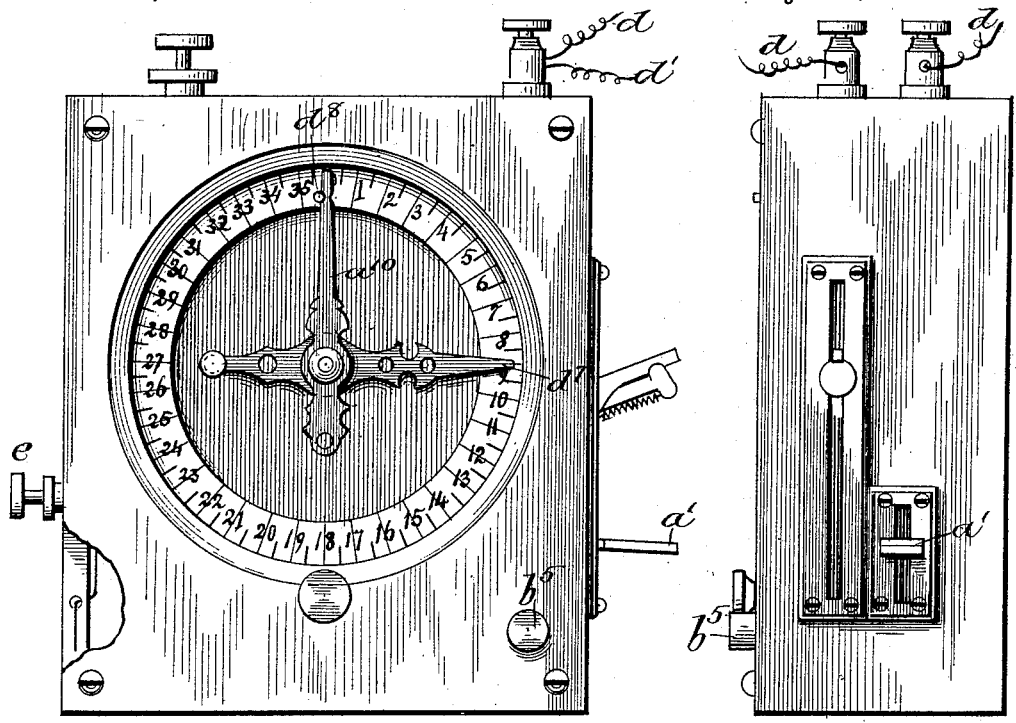
Figure 3:
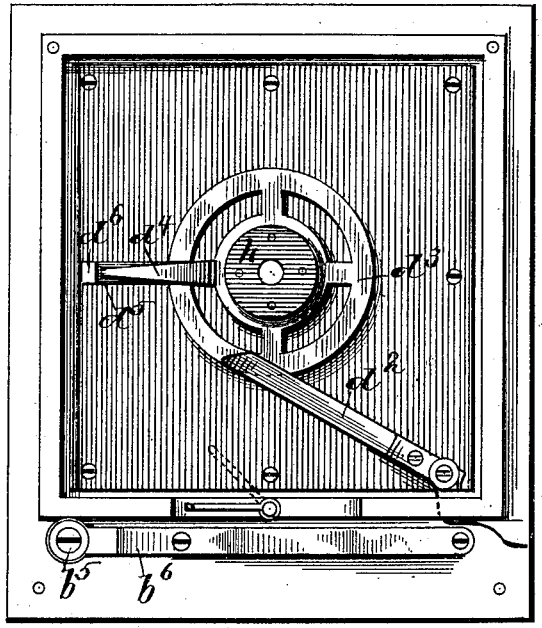

(No Model.)
D. O'HARA.
CHAIN GUARD FOR WATCH BOWS.
No. 432,762. Patented July 22, 1890.
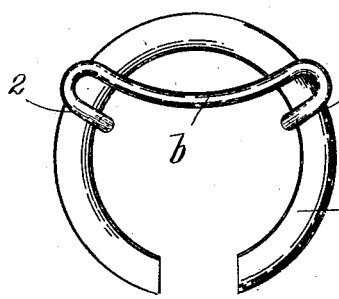
FIG.1.
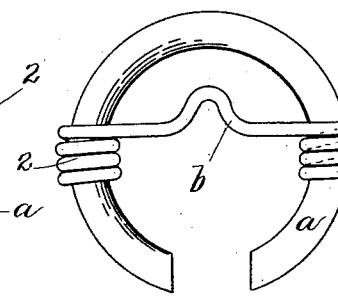
FIG.2.
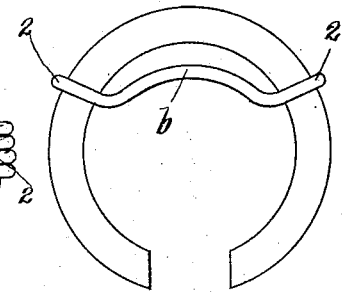
FIG.3.
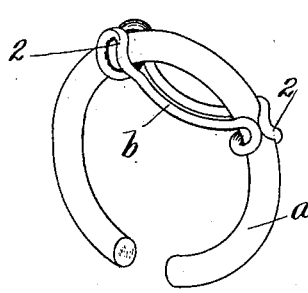
FIG.4.
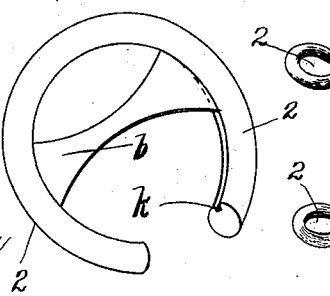
FIG.12.
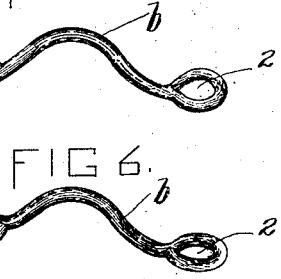
FIG.5.
FIG.6.
FIG.7.
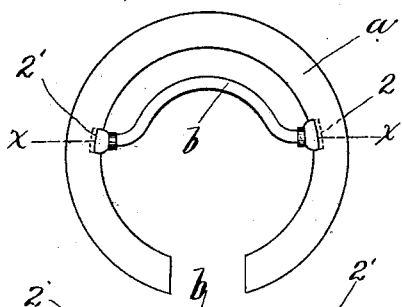
FIG.10.
FIG.11.
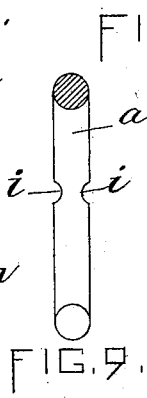
FIG.9.
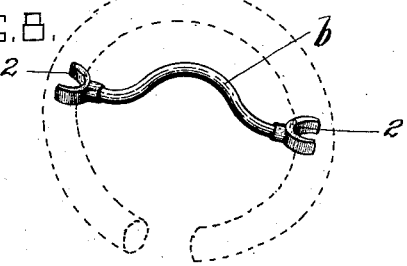
FIG.8.
WITNESSES:
H. Brown
A. D. Harrison
INVENTOR
D. O'Hara
by Wright Brown Kennedy
Atty.

(No Model.) 4 Sheets—Sheet 1.

W. A. BLOMGREN.
PHOTO ENGRAVING APPARATUS.

No. 432,783. Patented July 22, 1890.

Witnesses
W. C. Coolies
J. E. Vogel

Inventor
William A. Blomgren,
By Wm. Zimmerman,
Atty.